United States Patent [19]

Clausen

[11] 4,329,801

[45] May 18, 1982

[54] TIMETABLE HOLDER TO BE PLACED ON A POST AT A BUS OR STREET CAR STOP

[76] Inventor: Poul J. Clausen, Dyrehavehus, No. 344 Vordingborgvej, 4690 Haslev, Denmark

[21] Appl. No.: 132,845

[22] Filed: Mar. 24, 1980

[30] Foreign Application Priority Data

Mar. 28, 1979 [DK] Denmark ............................ 1265/79

[51] Int. Cl.3 ........................ G09F 15/00; G09F 3/18; G09F 7/02; F16M 13/00

[52] U.S. Cl. .......................................... 40/607; 40/19; 40/611; 40/506; 248/159

[58] Field of Search ................. 40/607, 610, 611, 616, 40/568, 493, 502, 503, 506, 377, 19; 248/159, 351

[56] References Cited

U.S. PATENT DOCUMENTS

| | | | |
|---|---|---|---|
| 1,637,988 | 8/1927 | Egan | 40/502 |
| 2,507,875 | 5/1950 | Williams | 40/607 |
| 2,514,814 | 7/1950 | Towne | 40/454 X |
| 2,539,546 | 1/1951 | McGuire | 40/607 |
| 3,313,056 | 4/1967 | Williams et al. | 40/502 |
| 3,579,885 | 5/1971 | Iverson | 40/607 |
| 3,713,237 | 1/1973 | Thomson et al. | 40/607 |
| 3,947,987 | 4/1976 | Allen | 40/506 X |
| 3,986,284 | 10/1976 | Plantinga | 40/607 |
| 4,164,084 | 8/1979 | Crockett | 40/19 |

FOREIGN PATENT DOCUMENTS

| | | | |
|---|---|---|---|
| 370061 | 6/1930 | Belgium | 40/607 |
| 910129 | 4/1954 | Fed. Rep. of Germany | 40/607 |
| 2601319 | 7/1976 | Fed. Rep. of Germany | 40/607 |
| 2260840 | 9/1975 | France | 40/607 |
| 568001 | 10/1957 | Italy | 40/607 |
| 370635 | 8/1963 | Switzerland | 40/607 |
| 575050 | 4/1976 | Switzerland | 40/607 |
| 970839 | 9/1964 | United Kingdom | 40/607 |

*Primary Examiner*—Robert Peshock
*Assistant Examiner*—Michael J. Foycik
*Attorney, Agent, or Firm*—Bernard, Rothwell & Brown

[57] ABSTRACT

The timetable holder is mounted on a post and has a cylindrical element journalled around the post and has at least one tube of transparent material for the housing of a timetable which can be read from outside through the tube side wall, the tube being closed at both ends by a sleeve mounted on the post and securable to it.

7 Claims, 9 Drawing Figures

TIMETABLE HOLDER TO BE PLACED ON A POST AT A BUS OR STREET CAR STOP

BACKGROUND OF THE INVENTION

The present invention relates to a timetable holder to be placed on a post at a bus or street car stop, comprising a tubular timetable supporting element journalled around the post.

It is known to design a timetable holder as a plate with planar two-piece frame which can be secured to the post by means of straps or clamps. The timetable itself is placed on the plate, whereupon the two frame pieces are locked together.

This known timetable holder is often exposed to wanton destruction. Since the plate presents quite important dimensions in relation to the post and is centrally tightened to the post it is quite easy by leverage action and with relatively weak forces to break the frame to pieces or to loosen the plate from its securing means.

Thus, arises the need of a timetable which is notably more able to withstand destruction attempts.

The too frequent replacement of damaged timetable holders and the need of regularly—e.g. twice a year—changing the time schedule (summer time schedule/winter time schedule) implies for the traffic companies important expenses in material and work, especially because the changing of timetable is in itself time consuming.

Another problem is related to the manufacturing of said known timetable holder. The frame and the corresponding holder parts for lodging the securing means are manufactured by mold plastic material. For the manufacturing, a mold of rather important dimensions is needed and it is a known fact that the manufacturing of molding tools for planar objects is always time consuming, which also influences the production price for the molded object. Furthermore, the manufacturing of the frame presents molding technique related difficulties.

From German published patent application No. 26 01 319 a timetable holder is known in which the timetable itself is placed on the outer face of a prismatic body made of aluminium sheet or sheets, which body by means of a number of different pieces and sleeves is mounted on a supporting tube which again is fastened to the post.

Since the timetable itself is located on the outer face of said prismatic body it is absolutely not protected against weather or against wanton attempts to damage or destroy it. Furthermore, the prismatic body is not journalled around its supporting tube or around the post and thus not very handy, especially because at night the lighting conditions at the bus stop in question may be rather poor and thus, the users have no possibility of rotating the timetable around the post in order to try to obtain better lighting conditions. Still further, since it is made of aluminium sheet or sheets, it cannot withstand strong forces and may thus easily be wantonly damaged. Still further, the whole design is mechanically complicated and thus rather expensive and the work in replacing a new timetable is time consuming, in particular due to the prismatic shape of said body.

SUMMARY OF THE INVENTION

It is an object of the present invention to remedy the stated disadvantages of the prior art and in view thereof a timetable holder according to the invention is characterized in that the tubular element comprises at least on tube of transparent material for the housing of said timetable and by one lower tube support sleeve, first means for securing said support sleeve to said post, one upper tube closing sleeve surrounding said post, means for securing said upper sleeve to said post, and means on said lower sleeve and said upper sleeve, respectively, for journally guiding said transparent tube in relation to said sleeves.

The invention is based on the admission that the cylindrical shape of the timetable holder ensures the best protection against destruction attempts because it rules out the leverage action which can be exerted with the ordinary planar holder and the possibility of exerting forces on the prismatic timetable support body. It should here be noted that from German Patent Specification No. 910,129 a timetable holder is known comprising a cylindrical sheet with one single sleeve journalled around the post. In view of the very few details given in said patent specification, one may assume that the cylindrical sheet forms a sort of can which is opened underneath. Said timetable holder cannot ensure the desired protection against destruction attempts, partly because the timetable itself is presumably placed on the outer face of the cylindrical sheet and thus is directly accessible from outside and may easily be damaged, partly because the cylindrical wall is only supported at one end, viz. by means of one single sleeve.

In the time table holder according to the invention, the transparent tube is supported at both ends. Since it is located inside the tube, the timetable will be completely protected. The tube itself and the sleeves can be manufactured without considerable molding technique related problems and by means of molding tools which are considerably easier and cheaper to manufacture.

Furthermore, and in the same way as the prior art design known from said German patent specification the timetable holder can easily be rotated around the post, whereby the user may place it under the most convenient lighting conditions at the bus stop in question, but in contrast with said prior art the timetable holder is supported both at the top and at the bottom, whereby a much more solid design is obtained.

Furthermore, the work in changing the timetable is made much easier in that the upper sleeve can be loosened from the post, shifted upwards, and again secured to the post, whereafter the maintenance man can use both hands for quickly withdrawing the timetable and inserting a new timetable in the transparent tube. Then, the upper sleeve can be loosened from the post and shifted downwards in order to close again the tube, after securing to the post.

BRIEF DESCRIPTION OF THE DRAWINGS

The invention will be explained thereinafter with reference to the schematical drawing in which.

DETAILED DESCRIPTION

Figure 1:
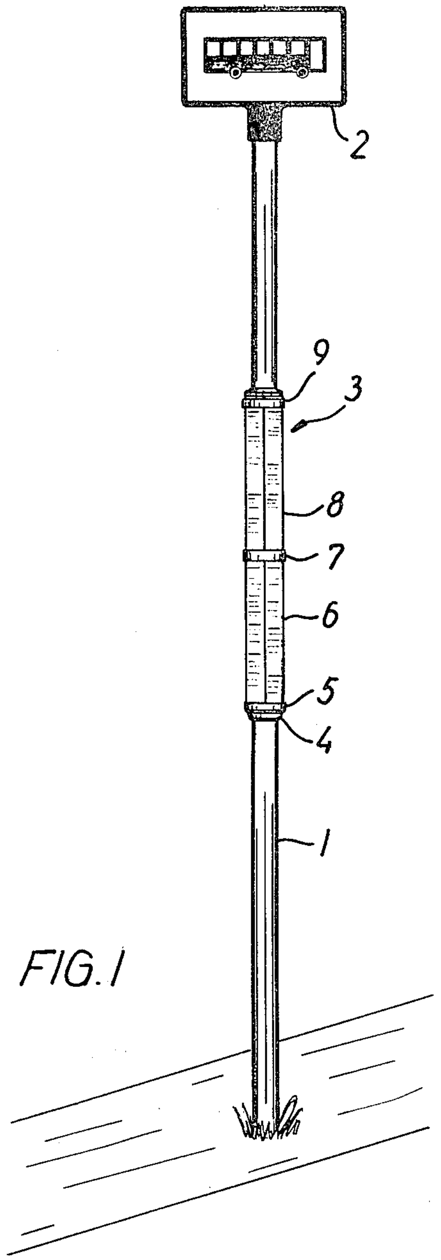
FIG. 1 shows the timetable holder according to the invention mounted on a post at a bus stop, FIG. 2 a timetable holder with two transparent tubes, FIG. 3 a timetable holder with one single transparent tube, FIG. 4 the timetable holder according to FIG. 2, shown partly in longitudinal cross section, FIGS. 5, 6, 7 and 8 the different sleeves of the timetable holder, seen in axial direction, and FIG. 9 a cross section through a special transparent tube with magnifying effect.

FIG. 1 shows a bus stop post comprising a metal tube 1, e.g. steel tube, a bus stop sign 2 of common design, located at the upper end of the metal tube, and a timetable holder 3 according to the invention, mounted on the metal tube 1.

In the embodiment shown in FIG. 1 the timetable holder 3 comprises a sleeve 4 which surrounds the metal tube 1 and can be secured to the metal tube 1, a sleeve 5 which is located on the sleeve 4 and surrounds the tube 1 and is freely rotatable in relation to the sleeve 4, a tube 6 of transparent material located on the rotatable sleeve 5, a sleeve 7, a so-called intermediary sleeve, which is freely rotatable in relation to the tube 6, a tube 8 of transparent material located on the intermediary sleeve 7, and an upper sleeve 9 which can be secured to the metal tube 1.

Figure 2:
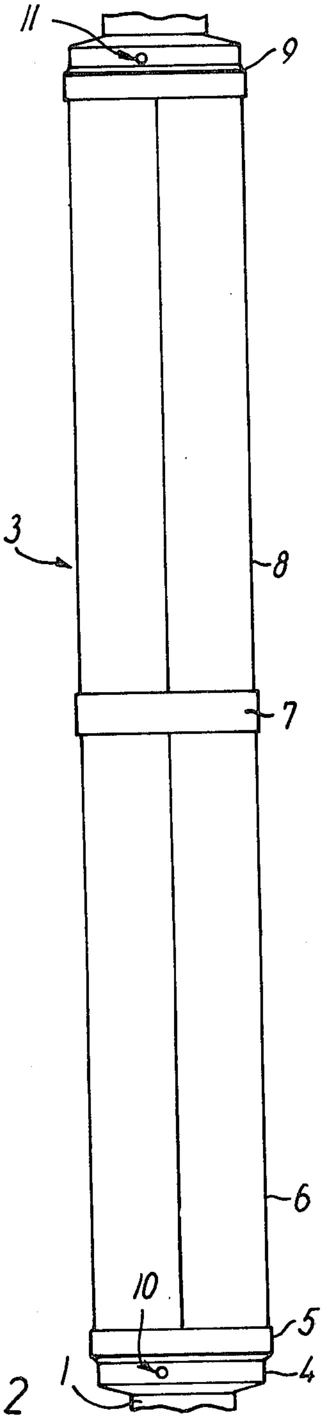

FIG. 2 represents on a larger scale the timetable holder 3 shown in FIG. 1. FIG. 2 shows again the sleeves 4, 5, 7, and 9 and the two transparent tubes 6 and 8. The lower sleeve 4 is secured to the metal tube 1 by means of a pointed screw 10, preferably a screw of such a design known per se that it will not fall from the sleeve when it is loosened from the metal tube.

Figure 3:
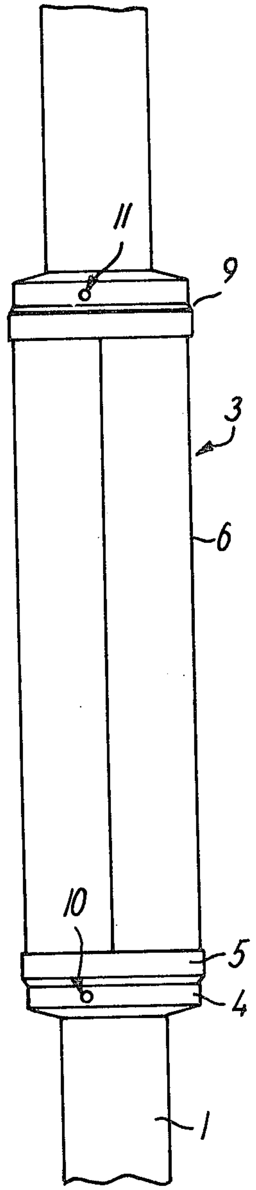

While FIGS. 1 and 2 show an embodiment of the timetable holder 3 with two transparent tubes 6 and 8, FIG. 3 shows a simplified embodiment in which there is only one single transparent tube 6, the second tube 8 and the intermediary sleeve 7 having been suppressed. However, it should here be noted that it is possible to embody the timetable holder with more than two transparent tubes, e.g. three transparent tubes and two intermediary sleeves.

Referring now to FIGS. 4 to 8, FIG. 4 shows, partly in a sectional view, the details of a timetable holder with two transparent tubes as shown in FIGS. 1 and 2, while FIGS. 5 to 8 show separately each one of the four sleeves, seen in an axial direction.

As mentioned above, the lower sleeve 4 is secured to the metal tube 1 by means of the pointed screw 10 when the sleeve has been placed at a convenient height on the post. The lower sleeve 4 shown in FIGS. 4 and 5 as well as the other sleeves 5, 7, and 9 can be manufactured by molding plastic material such as acetate. As shown in FIG. 5 the lower sleeve 4 comprises internal ribs 12 extending radially and having circular cylindrical inner faces 12*a* designed for abutment against the metal tube 1 when the sleeve is mounted on said tube. Sleeves of said kind can be manufactured in a mould with a central removable core in such a way that by replacing one core with another core having a different size it is possible in the very same mold to manufacture a sleeve, the ribs 12 of which present a different size in the radial direction. This makes it possible with the very same mold and two mutually different molding cores to manufacture sleeves adapted to different metal tube diameters, e.g. 1.5"-tube or 2"-tube.

Figure 4:
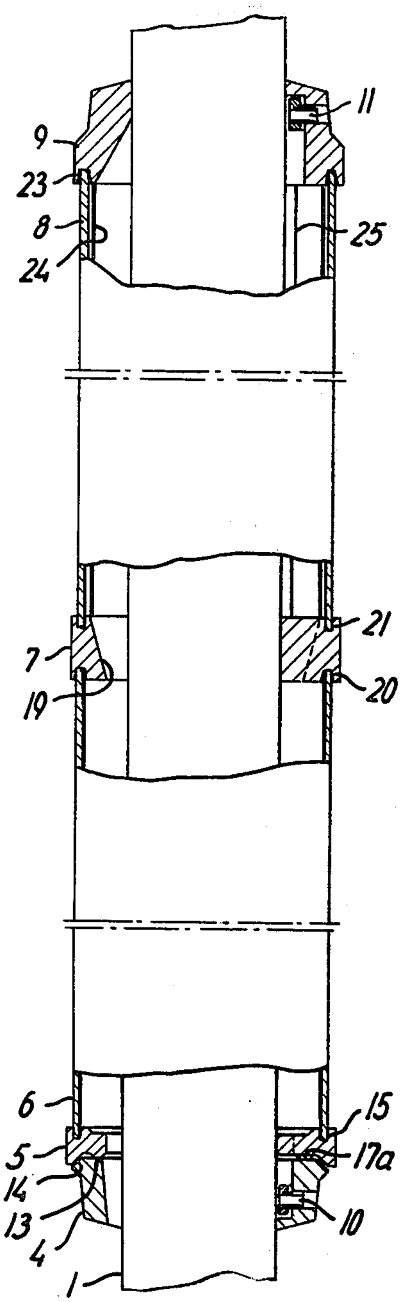
Figure 5:
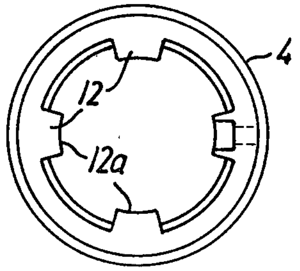

It can be seen in FIG. 4 that the sleeve 4 has an essentially horizontal upper face 13 and an edge face 14 extending radially outwards and downwards. Said two faces constitute gliding and centering faces for the sleeve 5, which is designed with a corresponding supporting underface and centering face. The sleeve 5 has a circular groove 15 in which the transparent tube 6 is inserted. Said groove 15 may have a slightly larger width than the wall thickness of the tube 6 so that the tube can freely rotate in the groove, but the tube may also be glued together with the sleeve, whereby the tube and the sleeve form a unit which can freely rotate on the lower sleeve 4.

Figure 6:
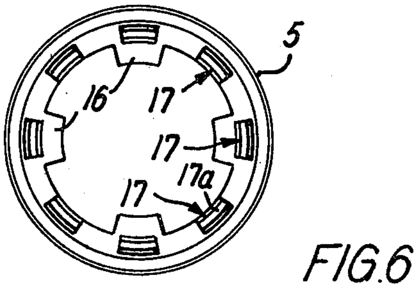

As shown in FIG. 6 the sleeve 5, in the same way as sleeve 4, is designed with inner radial guiding and centering ribs 16. It should be noted that sleeve 5, which in FIG. 6 is seen from below, has a supporting rib 17 which is divided up in e.g. eight parts, the underface 17*a* of said rib 17 forming supporting face of the sleeve. Said supporting faces 17*a* are placed upon the upper face 13 of the lower sleeve 4.

Apart from the supporting, gliding and guiding function, the edge face 14 on the lower sleeve 4 and the passages between successive support rib parts 17 fulfill another function, viz. water draining, no matter whether it is condensation water or rain drops which occasionally accumulate inside the transparent tube 6.

Figure 7:
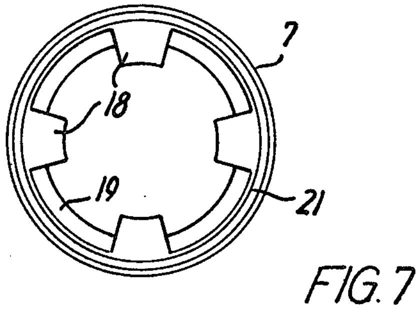

Referring now to FIGS. 4 and 7, the intermediary sleeve 7 is designed with radial guiding and centering ribs 18 extending inwardly. Between the ribs 18, the innerside of the sleeve 7 has such a shape that from the upper side to the underside of the sleeve it slopes inwards as shown by reference 19. The purpose of this sloping surface is to guide any condensation water drops coming from above away from the innerside of the tube 6.

The intermediary sleeve 7 has an annular groove 20 on the underside and an annular groove 21 on the upperside. The groove 20 may present a slightly larger width than the wall thickness of the tube 6 so that the intermediary sleeve 7 may freely rotate in relation to the tube 6 when said tube is inserted in the groove 20. The upper transparent tube 8 (FIG. 4) is inserted in the upper groove 21 of the intermediary sleeve 7.

Figure 8:
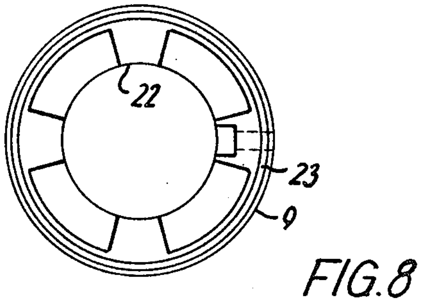

Referring now to FIGS. 4 and 8, the upper sleeve 9 is designed with radial guiding and centering ribs 22 extending inwardly. On the underside, the sleeve 9 has an annular groove 23 in which the upper edge of the transparent tube 8 is inserted. Said groove may have a slightly larger width than the wall thickness of the tube 8, whereby the sleeve 9 and the tube 8 can freely rotate in relation to one another.

A timetable to be placed in the transparent tube may consist of a typed or printed sheet between two transparent plastic sheets or a plastic sheet on which the different information, which is relevant to the bus stop in question, e.g. line number, departure time, arrival time etc., is printed, e.g. by silk printing.

Such a timetable is shown by reference numeral 24 in the upper transparent tube 8 of FIG. 4.

The mode of operation of the above described timetable holder is further explained thereinafter.

The lower sleeve 4 is located at a convenient height on the post 1 and fastened on it by means of the pointed screw 10 using e.g. a special key. Said screw may conveniently have an hexagonal recessed head, the key having then a corresponding hexagonal shape. Then, one places the sleeve 5 and the transparent tube 6 and if the timetable holder is to be embodied as shown in FIG. 3 with one single transparent tube 6, one closes said transparent tube by means of the upper sleeve 9. This sleeve 9 is secured to the post by means of the pointed screw 11, using the same key, but before that the maintenance man places the above mentioned timetable inside the transparent tube 6. Said timetable presents by itself a certain rigidity and when it is rolled up around the post in order to be pushed down the transparent tube it will immediately tend to unfold again, whereby it places itself in contact with the innerside of the transparent tube. Reference numeral 25 in FIG. 4 indicates the place where the two opposite edges of the timetable sheet may be in contact with one another.

It should be noted here that the pointed screw 11 in the upper sleeve 9 not only serves for securing said sleeve in such a position that the timetable holder is kept closed and its different parts cannot be separated from one another, but also, by temporarily securing it heigher up the post, serves to make the work of the maintenance man easier at the moment where the timetable sheet is to be placed in the transparent tube or where a timetable is to be replaced by a new timetable. Thus, the maintenance man will have free access to the inside of the holder and the possibility of using both hands for arranging the timetable in place. Thereafter, one loosen the pointed screw 11 and places again the sleeve 9 on the transparent tube.

If the timetable holder is to be embodied as shown in FIGS. 2 and 4 with two transparent tubes, the different parts of the holder are mounted on the post in the same way as described above.

For an easier positioning of a timetable in the lower transparent tube 6, the intermediary sleeve 7 may also be designed with a pointed screw, not shown on the drawing, by means of which said sleeve may be temporarily secured heigher up the post, whereby the maintenance man, also in this embodiment with two transparent tubes, is able to use both hands e.g. for taking away an absolete timetable and inserting a new one or for cleaning the different parts of the holders, if needed.

Figure 9:
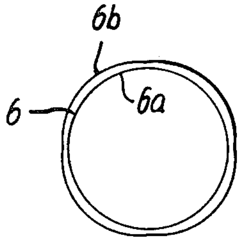

It has previously been stated that the sleeves are preferably made of molded plastic material. It is preferable to choose an impact resistant weatherproof plastic material, such as acetate. The tube itself, or the tubes, consists preferably of impact resistant plastic material, e.g. polycarbonate. Normally, such a tube will be manufactured by an extrusion process, but it may also be manufactured by injection molding. The tube may have a constant wall thickness, but it may also be shaped as shown in cross section in FIG. 9 from which it can be seen that the tube has a circular cylindrical inner face *6a* , while the outer face *6b* presents such a profile that on that tube e.g. four zones are obtained having magnifying glass effect. This is obtained by shaping said zones with progressively increasing and decreasing material thickness.

If the timetable in a similar way is tabulated in four columns, e.g. one column per bus line, the text on said timetable will appear magnified due to said magnifying effect.

Furthermore, it should be noted that the tube need not necessarily by cylindrical, e.g. circular cylindrical. It may also, especially if it is molded, be designed with a quite different cross section shape, e.g. triangular or quadrangular. In that case the molding process may shape the ends of the tube pieces in such a way that they will be adapted to preferably circular sleeves. Alternatively, the adaptation between e.g. a tube with triangular shape and circular sleeves can be ensured by means of intermediary elements, not shown on the drawing.

Furthermore, it should be noted that the described assembly is primarily conceived as a timetable holder but it may also be used for other purposes, e.g. as a support for different bus or train traffic information or as advertisement display pillar. At night, the lighting conditions, e.g. at a bus stop will allow the reading of the timetable but if so desired, e.g. under special conditions, a light source may be installed in the described timetable holder. The post can for instance be designed with an elongated opening, a fluorescent tube located inside the post emitting light through said opening. In that case the timetable itself will preferably be made of a transparent plastic sheet on which the relevant information is printed, e.g. by silk printing. This gives the customers, also weak-sighted persons, the best conditions for using the timetable holder by rotating the holder or the tube and placing the desired section with the desired information in front of the light emitting opening.

As stated before, the timetable holder may comprise e.g. three transparent tubes. The upper or third transparent tube (not shown) may conveniently be a short tube piece. A colored plastic sheet inserted in said upper transparent tube will immediately give the bus driver or the customers information such as fare stage (bus line section limit) or whether a certain bus stop with a certain color of said sheet in said upper transparent tube belongs to a certain bus line or not. The fact that said colored plastic sheet may also easily and quickly change makes it possible to conveniently adapting the timetable holder and, thus, the bus stop to any change in bus line route structure.

Finally, it should also be noted that while in the embodiments described above the guiding of the transparent tube or tubes is ensured by means of grooves in the different sleeves, said guiding may, alternatively, be ensured by shaping the sleeves with e.g. a collar surrounding the edge portion of the transparent tube or tubes or with separate projections or with a central disc-shaped projection designed for abutment against the innerside of the edge portion of the transparent tube or tubes.

I claim:

1. A timetable holder to be placed on a post at a bus or street car stop and comprising: a tubular timetable supporting element journalled around the post, the tubular element including at least one tube made at least partially of transparent material for the housing of said timetable and one lower tube support sleeve, first means for securing said support sleeve to said post, one upper tube closing sleeve surrounding said post, means for securing said upper sleeve to said post, and means on said lower sleeve and said upper sleeve for journally guiding said transparent tube in relation to said sleeves to permit rotation of said transparent tube about said post; said lower sleeve including a first ring accommodating said first securing means and a second ring placed on said first ring and freely rotatable in relation to said first ring, said second ring being a shape with an annular groove for receiving the lower edge of said transparent tube; and said two rings of said lower sleeve presenting on their sides facing one another open condensation water and rain drops draining passages.

2. A timetable holder according to claim 1,characterized in that said sleeves and the transparent tube are made of impact resistant material.

3. A timetable holder to be placed on a post at a bus or street car stop, comprising: a tubular timetable supporting element including at least one transparent tube of which at least one zone is of varying wall thickness in such a manner that the time table can be seen magnified; upper and lower supporting means for said tubular element, means on the upper and lower supporting means for guiding the tubular element to a coaxial position in relation to the post, a substantially annular surface on the lower supporting means to provide a sliding surface for the lower end surface of the tubular element and thereby taking up the weight of the tubular element, means for securing the upper and lower supporting means fixedly to the post in such mutual, axial distance that there is a free space above the upper end surface of the tubular element, whereby the tubular element is freely rotatable about the post.

4. A timetable holder as claimed in claim 3, further comprising an annular element on the lower end of the tubular element, having a substantially annular surface in contact with the substantially annular surface on the lower supporting means, one of said substantially annular surfaces being the top surface of a substantially circular rib on the respective element, whereby rotation of the tubular element about the post is facilitated.

5. A timetable holder according to claim 3, wherein the tubular element comprises a plurality of transparent tubes, an intermediary sleeve between each pair of adjacent tubes, said sleeves being shaped with a radially inwardly and downwardly extending inner face for guiding water drops from the inside of the upper adjacent tube away from the inner face of the lower adjacent tube.

6. A timetable holder as claimed in claim 3, wherein the tubular element comprises at least one transparent tube, in which is placed a timetable printed on a relatively rigid plastic sheet, whereby the sheet, when inserted into the tube, will automatically place itself smoothly against the inner surface of the tube.

7. A timetable holder to be placed on a post at a bus or street car stop and comprising: a tubular timetable supporting element journalled around the post; the tubular element includes two tube pieces, an upper tube piece and a lower tube piece, of transparent material for the housing of said timetable; a lower tube support sleeve surrounding said post; first means for securing said lower tube support sleeve to said post; an upper tube closing sleeve surrounding said post; second means for securing said upper sleeve to said post; an intermediary sleeve which on both sides is shaped with an annular groove for the upper edge of the lower tube piece and the lower edge of the upper tube piece, respectively; said intermediary sleeve being shaped with a radially inwards and downwards inner face for guiding condensation water drops and raindrops from the inside of the upper tube piece away from the inner face of the lower tube piece; and means on said lower sleeve and said upper sleeve for journally guiding said transparent tubes in relation to said sleeves.

* * * * *